United States Patent Office 2,762,806
Patented Sept. 11, 1956

2,762,806

2,3-ALKYLENEDIOXY-6-NITRO-9-AMINOACRIDINES AND THEIR SYNTHESIS

Edgar Alfred Steck, Guilderland, N. Y., assignor to Sterling Drug Inc., New York, N. Y., a corporation of Delaware No Drawing. Application October 27, 1953,
Serial No. 388,700

11 Claims. (Cl. 260—279)

This invention relates to 2,3-alkylenedioxy-6-nitro-9-aminoacridines and to their synthesis.

These compounds of my invention have in free base form the structure

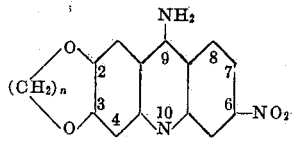

where $n$ is an integer from one to two. These compounds have been found to possess valuable chemotherapeutic properties, for instance, antirickettsial activity.

My 2,3-alkylenedioxy-6-nitro-9-aminoacridines were prepared preferably by heating a mixture of phenol and the appropriate 2,3-alkylene-dioxy-6-nitro-9-haloacridine to form the corresponding 2,3-alkylenedioxy-6-nitro-9-phenoxyacridine as the hydrohalide, which did not need to be isolated, and then heating the 2,3-alkylenedioxy-6-nitro-9-phenoxyacridine hydrohalide with an aminating agent, i. e., a compound which on heating produces available ammonia, such as ammonium carbonate, ammonium bicarbonate, ammonium carbamate, ammonium acetate, and the like. In carrying out my invention, I preferred to use commercial ammonium carbonate which actually is a mixture of ammonium bicarbonate and ammonium carbamate (see page 62 of the Sixth Edition of "The Merck Index," Merck & Co., Inc., Rahway, N. J., 1952 or page 810 of the Fourth Edition of Ephraim's "Inorganic Chemistry," Nordeman Publishing Co., Inc., New York, N. Y., 1943). Illustrative of this preparation is the reaction of 2,3-methylenedioxy-6-nitro-9-chloroacridine with phenol to form 2,3-methylenedioxy-6-nitro-9-phenoxyacridine mono hydrochloride which on treatment, in either pure form or crude form (as directly obtained from the reaction mixture of the first step), with commercial ammonium carbonate yields 2,3-methylenedioxy-6-nitro-9-aminoacridine.

Alternatively, but not as satisfactorily, the 2,3-alkylenedioxy-6-nitro-9-aminoacridines of my invention can be prepared by directly heating the appropriate 9-haloacridine with an aminating agent such as commercial ammonium carbonate, without first reacting the former compound with phenol.

The preparation of my 2,3-alkylenedioxy-6-nitro-9-aminoacridines was carried out under acidic conditions. When the reactant was a 2,3-alkylenedioxy-6-nitro-9-haloacridine, an acidic medium was afforded by the presence of the hydrohalic acid formed in the reaction. When the reactant was a 2,3-alkylenedioxy-6-nitro-9-phenoxyacridine, acidic conditions were produced either by using the 9-phenoxy compound in the form of its hydrohalic acid addition salt or by adding a small amount of a mineral acid.

The 2,3-alkylenedioxy-6-nitro-9-aminoacridines of my invention are therapeutically active whether employed in the form of their free bases or in the form of their salts with relatively non-toxic organic or inorganic acids. These salts can be prepared by treating the appropriate 2,3-alkylenedioxy-6-nitro-9-aminoacridine described above with the appropriate acid. In practicing the invention, it has been found convenient to isolate the compounds in the form of their hydrochlorides. However, other acid addition salts are within the scope of the invention. Such salts include the hydrobromides, hydroiodides, sulfates, phosphates, nitrates, citrates, sulfamates, tartrates, succinates, acetates, benzoates, oleates, and the like.

The following examples further illustrate specific embodiments of the invention.

Example 1

(a) *2,3-methylenedioxy-6-nitro-9-chloroacridine.*—This compound was prepared by first heating 2-chloro-4-nitrobenzoic acid with 3,4-methylenedioxyaniline in the presence of copper powder to produce 2-(3,4-methylenedioxyphenylamino)-4-nitrobenzoic acid, which was then heated in toluene solution with phosphorus oxychloride to effect ring closure. These procedures are given in the following paragraphs:

A solution of 98.5 g. of anyhdrous potassium carbonate in 145 ml. of water was heated to 60° C. with stirring. To this solution was added 144 g. of 2-chloro-4-nitrobenzoic acid, followed by 8 g. of copper powder, 8 g. of a filter aid such as Filtercel (an infusorial earth), and 98.5 g. of 3,4-methylenedioxyaniline dissolved in 500 ml. of ethanol. Ethanol was then removed by distillation until an internal temperature of 95° C. was reached, and the resulting solution was refluxed for five hours. The reaction mixture was steam distilled to remove any unreacted aniline derivative. The aqueous residue was filtered while hot and the collected solid was extracted three times with boiling water. The combined filtrate and extracts were chilled in an ice bath and acidified with an excess of concentrated hydrochloric acid. The red solid that separated was collected and purified by recrystallization from acetone-water. There was thus obtained 106.3 g. of 2-(3,4-methylenedioxyphenylamino) - 4 - nitrobenzoic acid, M. P. 240–241° C.

*Analysis.*—Calcd. for $C_{14}H_{10}N_2O_6$: C, 55.63; H, 3.34; N, 9.27. Found: C, 55.52; H, 3.36; N, 9.40.

Ring closure was eeffected as follows: 106.3 g. of 2-(3,4 - methylenedioxyphenylamino)-4-nitrobenzoic acid was dissolved in 1064 ml. of toluene. The solution was heated to reflux, heating stopped, and 155 g. of phosphorus oxychloride was added over a fifteen minute period. Heating was resumed at gentle reflux with stirring for three and one-half hours. The reaction mixture was cooled and the precipitate that separated was collected. The precipitate was added over a thirty minute period to a chilled (0° C.) solution containing 310 ml. of 10% aqueous sodium hydroxide solution and 410 ml. of water. The mixture was stirred for an additional two hours at 0° C. The solid was collected, triturated with ammonium hydroxide solution, washed with cold water and recrystallized from chlorobenzene. There was thus obtained 67.5 g. of 2,3-methylenedioxy-6-nitro-9-chloroacridine, M. P. 300–301° C.

*Analysis.*—Calcd. for $C_{14}H_7N_2ClO_4$: C, 55.55; H, 2.33; $N_{NO_2}$, 4.63; Cl. 4.71. Found: C, 55.51; H, 2.33; $N_{NO_2}$, 4.57; Cl. 11.82.

The above 2,3-methylenedioxy-6-nitro-9-chloroacridine and the corresponding 2,3-ethylenedioxy-6-nitro-9-chloroacridine of Example 2 (a) are disclosed and claimed in my copending U. S. application, Serial Number 388,698, filed October 27, 1953.

(b) *2,3-methylenedioxy-6-nitro-9-aminoacridine.*—To a stirred solution of 12.1 g. of 2,3-methylenedioxy-6-nitro-9-chloroacridine dissolved in 43 g. of phenol kept at a temperature of about 75° C. was added 5.2 g. of powdered ammonium carbonate, whereupon the temperature raised rapidly to about 120° C. The reaction mixture was kept at this temperature for about forty-five minutes, chilled to 30° C., and then poured into a solution containing a mixture of 120 ml. of acetone and 30 ml. of concentrated hydrochloric acid. The orange solid that separated was washed respectively with acetone and an ether solution of hydrogen chloride, and was recrystallized from water to which was added a solution of hydrogen chloridee in acetone. The resulting golden-colored product, 2,3-methylenedioxy-6-nitro-9-aminoacridine as its hydrochloride, melted at 250–251° C. with decomposition.

*Analysis.*—Calcd. for $C_{14}H_9N_3O_4 \cdot HCl$: $N_{NO_2}$, 4.36; Cl, 11.09. Found; $N_{NO_2}$, 3.54 and 3.58; Cl, 9.42.

Following the above procedure in the absence of phenol, i. e., heating 2,3-methylenedioxy-6-nitro-9-chloroacridine directly with powdered ammonium carbonate, the same product, 2,3-methylenedioxy-6-nitro-9-aminoacridine in the form of its monohydrochloride, can be obtained.

*Example 2*

(a) *2,3-ethylenedioxy-6-nitro-9-chloroacridine.*—This compound was prepared following the procedure described under Example 1 (a), as follows:

2-(3,4-ethylenedioxyphenylamino)-4-nitrobenzoic acid was prepared using 124 g. of anhydrous potassium carbonate in 182 ml. of water, 180 g. of 2-chloro-4-nitrobenzoic acid, 6 g. of copper powder, and 136 g. of 3,4-ethylenedioxyaniline in 1300 ml. of methanol. The product was obtained as golden-brown needles, M. P. 249–250.5° C. (cor.) when recrystallized from ethanol-water.

*Analysis.*—Calcd. for $C_{15}H_{12}N_2O_6$: C, 56.96; H, 3.38; $N_{NO_2}$, 4.43. Found: C, 57.23; H, 3.53; $N_{NO_2}$, 4.32.

Ring closure was effected as in Example 1 (a) using 86 g. of 2-(3,4-ethylenedioxyphenylamino)-4-nitrobenzoic acid, 945 ml. of toluene and 113 g. of phosphorus oxychloride. The product, 2,3-ethylenedioxy-6-nitro-9-chloroacridine, melted at 282–284° C. with decomposition when recrystallized from chlorobenzene.

*Analysis.*—Calcd. for $C_{15}H_9N_2O_4Cl$: C, 56.88; H, 2.87; Cl, 11.19. Found: C, 57.42; H, 2.87; Cl. 11.50.

(b) *2,3-ethylenedioxy-6-nitro-9-aminoacridine.*—This preparation was carried out following the procedure described above for Example 1 (b) using 12.7 g. of 2,3-ethylenedioxy-6-nitro-9-chloroacridine, 43 g. of phenol and 5.2 g. of powdered ammonium carbonate. The crude product thus obtained (16.0 g.) was crystallized by dissolving it in 800 ml. of water at 80° C. and adding 20 ml. of concentrated hydrochloric acid to the filtered solution. A second recrystallization in the same manner yielded, as brick red microcrystals, 2,3-ethylenedioxy-6-nitro-9-aminoacridine in the form of its monohydrochloride, M. P. above 300° C.

*Analysis.*—Calcd. for $C_{15}H_{11}N_3O_4 \cdot HCl$: N, 12.59; Cl, 10.62. Found: N, 12.60; Cl, 10.68.

The above 2,3-alkylenedioxy-6-nitro-9-aminoacridines of my invention have antirickettsial activity, e. g., against epidemic typhus, as determined by the chick embryo technique.

I claim:

1. A compound selected from the group consisting of a 2,3-alkylenedioxy-6-nitro-9-aminoacridine having the structure

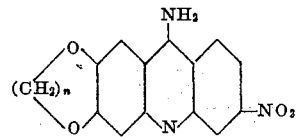

where $n$ is an integer from one to two, and acid addition salts thereof, 2. 2,3-methylenedioxy-6-nitro-9-aminoacridine.

3. 2,3-ethylenedioxy-6-nitro-9-aminoacridine.

4. The process of preparing a 2,3-alkylenedioxy-6-nitro-9-aminoacridine having the structure

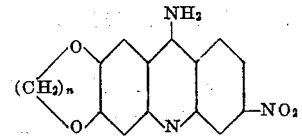

where $n$ is an integer from one to two, which comprises heating a member of the group consisting of the corresponding 2,3-alkylenedioxy-6-nitro-9-haloacridine and 2,3-alkylenedioxy-6-nitro-9-phenoxyacridine with an aminating agent under acidic condition.

5. The process of preparing a 2,3-alkylenedioxy-6-nitro-9-aminoacridine having the formula

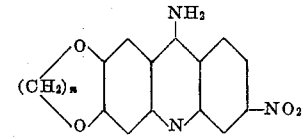

where $n$ is an integer from one to two, which comprises heating the corresponding 2,3-alkylenedioxy-6-nitro-9-phenoxyacridine with an aminating agent under acidic conditions.

6. The process of preparing 2,3-methylenedioxy-6-nitro-9-aminoacridine which comprises heating 2,3-methylenedioxy-6-nitro-9-phenoxyacridine hydrochloride with an aminating agent.

7. The process of preparing 2,3-ethylenedioxy-6-nitro-9-aminoacridine which comprises heating 2,3-ethylenedioxy-6-nitro-9-phenoxyacridine hydrochloride with an aminating agent.

8. An acid addition salt of 2,3-methylenedioxy-6-nitro-9-aminoacridine.

9. An acid addition salt of 2,3-ethylenedioxy-6-nitro-9-aminoacridine.

10. 2,3-methylenedioxy-6-nitro-9-aminoacridine monohydrochloride.

11. 2,3-ethylenedioxy-6-nitro-9-aminoacridine monohydrochloride.

References Cited in the file of this patent

UNITED STATES PATENTS

| | | |
|---|---|---|
| 1,962,277 | Jensch | June 12, 1934 |
| 2,531,010 | Surrey | Nov. 21, 1950 |
| 2,531,012 | Surrey | Nov. 21, 1950 |
| 2,647,900 | Surrey | Aug. 4, 1953 |